United States Patent [19]
VanDeMoere et al.

[11] Patent Number: 5,353,165
[45] Date of Patent: Oct. 4, 1994

[54] ONE PIECE VIEWFINDER AND FABRICATION PROCESS

[75] Inventors: Alan V. VanDeMoere; Ralph M. Lyon; Edward N. Balling, all of Rochester, N.Y.

[73] Assignee: Eastman Kodak Company, Rochester, N.Y.

[21] Appl. No.: 945,186

[22] Filed: Sep. 15, 1992

[51] Int. Cl.$^5$ .............................................. G02B 7/02
[52] U.S. Cl. ................................... 359/819; 359/744; 264/328.11; 425/556; 354/149.11
[58] Field of Search ............... 359/362, 367, 399, 402, 359/819, 823; 264/328.1, 328.11; 425/543, 556; 354/288, 219, 149.2

[56] References Cited
U.S. PATENT DOCUMENTS

| 3,523,738 | 8/1970 | Chisholm | 359/362 |
| 4,715,804 | 12/1987 | Takahashi | 264/328.11 |
| 4,812,866 | 3/1989 | Ushiro et al. | |
| 4,882,600 | 11/1989 | VanDeMoere | |
| 4,913,718 | 4/1990 | Yoshimura et al. | 65/104 |
| 4,921,205 | 5/1990 | Drew, Jr. et al. | 249/61 |
| 4,932,764 | 6/1990 | Simpson, Jr. | 350/441 |
| 4,973,998 | 11/1990 | Gates | 354/288 X |
| 5,063,400 | 11/1991 | Takei et al. | 354/288 |
| 5,083,146 | 1/1992 | Veda | 354/149.11 |
| 5,210,557 | 5/1993 | Kameyama et al. | 354/120 |

FOREIGN PATENT DOCUMENTS

| 650908 | 10/1937 | Fed. Rep. of Germany | 354/219 |
| 2002361 | 7/1975 | Fed. Rep. of Germany . | |
| 3146026 | 6/1982 | Fed. Rep. of Germany | 354/219 |
| 912942 | 12/1962 | United Kingdom . | |
| 1196632 | 1/1970 | United Kingdom . | |

Primary Examiner—Edward K. Look
Assistant Examiner—Hoang Nguyen
Attorney, Agent, or Firm—Roger A. Fields

[57] ABSTRACT

A unibody viewfinder for use in a single use camera includes a pair of optically aligned lenses integrally connected to a support structure which may, for instance, be the top surface of such a camera. A mold and method for making the viewfinder in a single molding process includes means for retracting the lens-forming elements to allow release of the viewfinder despite the presence of undercuts in the finished product.

53 Claims, 8 Drawing Sheets

ONE PIECE VIEWFINDER AND FABRICATION PROCESS

FIELD OF THE INVENTION

The present invention relates generally to optical systems, and more particularly to a complete optical viewfinder system and a process for making it.

BACKGROUND OF THE INVENTION

Recent manufacturing breakthroughs have made it possible to manufacture inexpensive, single-use cameras. Such cameras typically include all the basic necessities for capturing an image on film, but at the same time are constructed from inexpensive materials and hence can either be discarded after a single use or recycled by a manufacturer and resold. The necessary features in such a single-use camera include a roll of film, a taking lens, a shutter release, a film advance and a view finder.

For single-use cameras to be manufactured profitably, it is essential that they be capable of being manufactured from inexpensive materials and with a minimum of assembly steps. To accomplish this, it has been the practice of many single-use camera manufacturers to use an "air viewfinder" to act as a pointing and framing guide for the camera user. An air viewfinder typically is simply an opening extending through the camera from front to back, the central axis of the opening extending generally in the same direction as the focal axis of the taking lens of the camera. Alternatively, an air viewfinder may include a flaming guide, such as a sight, which can be a plastic member disposed within the viewfinder to assist the user in determining the boundaries of an image to be photographed.

For instance, U.S. Pat. No. 4,812,866 to Ushiro, et al., describes a molded front cover of a single-use camera which has integrally molded therein a single lens. The lens can be either a taking lens or a viewfinder lens. Such a viewfinder does not yield an optically enhanced image, however.

Conversely, viewfinders in conventional cameras are "optical viewfinders". An optical viewfinder provides an optically aided view of the image to be captured on film. An optically aided view can more accurately convey to the user the boundaries of the image to be captured. An optical viewfinder employs two or more viewfinder elements, or lenses, mounted in a holder. In multiple-use cameras, which are considerably more expensive to manufacture than single-use cameras, multi-lens viewfinders are assembled from separately manufactured lenses. This multi-lens viewfinder design has been avoided in single-use cameras, however, because of the prohibitive cost. To incorporate such viewfinders in single-use cameras, it has been necessary to manufacture each lens separately, assemble the lenses to form a viewfinder system and then incorporate the viewfinder system into the camera. Not only do the separate steps of manufacture and assembly impose extra cost in their own right, extra care must be taken during assembly to ensure that the lenses are kept clean and aligned properly, further adding to the expense.

To reduce cost, it would be desirable to form the viewfinder system in one molding process. Until now, however, no method has existed for forming an optical viewfinder system in a single molding process. The inability to form such a system arises from the necessity that the lenses be curved to present an optically aided view of the image to be photographed. As is known in molding technology, curves and indentations in an object to be molded create "undercuts," or protrusions, into the molded object. These undercuts prevent the molded object from being ejected from a typical mold without destroying either the mold or the molded object.

While it is known to mold in a single molding process items having undercuts, the known techniques have yet to be applied to the lens-crafting art. The difficulty with manufacturing lenses lies in the strict requirements for mold surface position and texture. The surfaces of a lens-forming mold must be highly polished in order to yield a product with surfaces of optical quality without post-molding polishing of the formed lenses.

Thus, a need has arisen for a method of producing an optical viewfinder system in a single-step molding process, despite the presence of undercuts which make part ejection difficult.

PROBLEM TO BE SOLVED

It is an object of the present invention to provide a mold and a molding process which overcome the problems associated with molding multi-lens viewfinders described above. It is a further object of the present invention to provide an optical view finder which can be manufactured simply and inexpensively.

SUMMARY OF THE INVENTION

Briefly described, a method of making a unibody viewfinder having a plurality of lenses aligned along a common principal axis, in which the viewfinder has at least one projection, includes providing a mold having inner surfaces which define a molding volume in the shape of the viewfinder. A lens forming material is then introduced into the mold. The inner surfaces of the mold include a plurality of pairs of highly polished surfaces for molding opposite sides of a plurality of the lenses. The method also includes solidifying the lens forming material in the shape of the molding volume, such that the lens forming material is hardened into the shape of the viewfinder. Finally, the method includes the removal of the viewfinder from the mold.

DETAILED DESCRIPTION

Figure 1C:
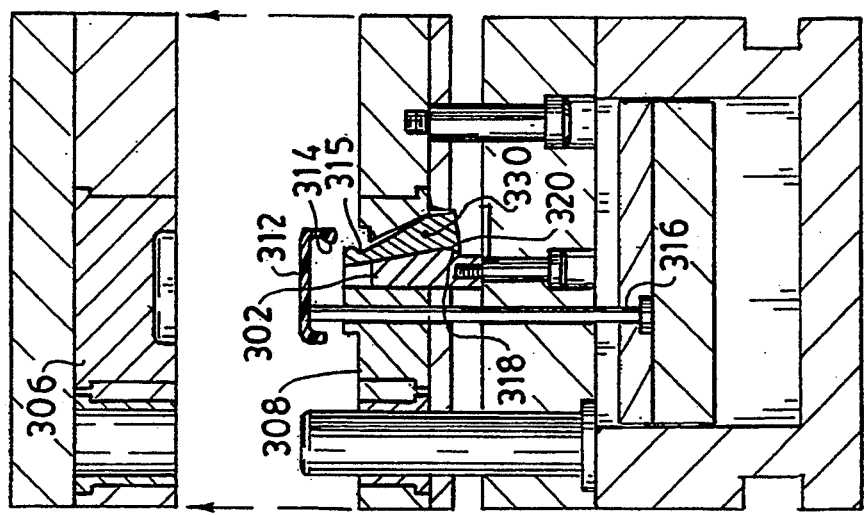
FIG. 1(a), 1(b) and 1(c) are sequential views of a molding device and process useful for molding items having undercuts therein.
Figure 1B:
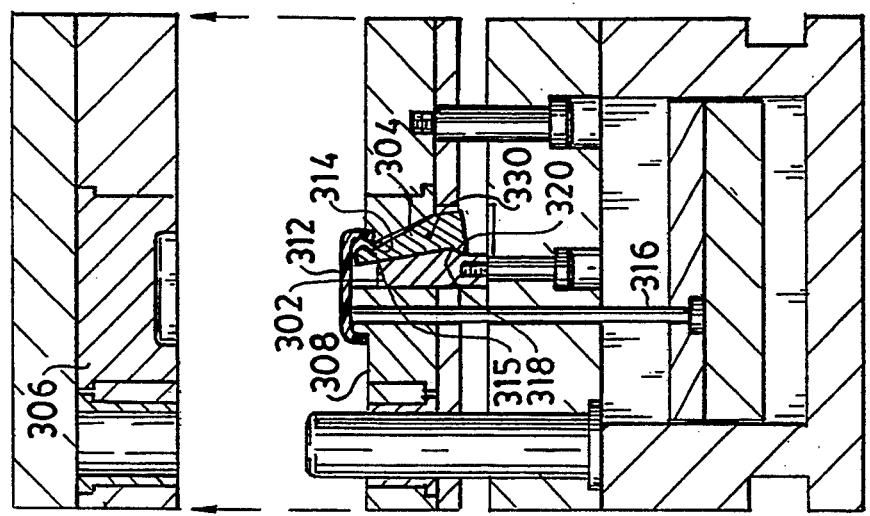
Figure 1A:
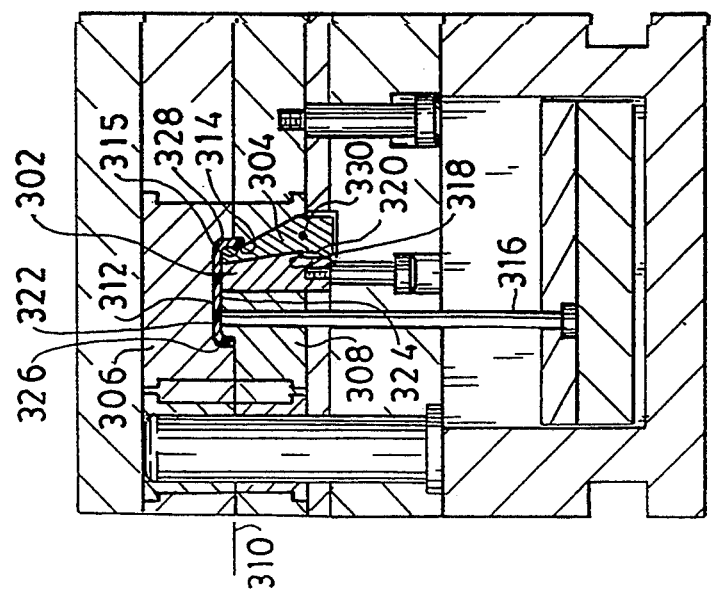

FIG. 1 shows a generalized, sequential view of a molding apparatus in accordance with the present invention. The mold depicted in FIGS. 1(a)–1(c) operates as follows. FIG. 1(a) shows the mold in its molding position, i.e., all the components of the mold are disposed to form a molding volume in which piece 312 can be formed. The mold has an upper molding member 306, a lower molding member 308, a wedge 302, a flipper 304, and an ejection pin 316. Wedge 302 and flipper 304 have protrusions 318 and 320, respectively which are aligned vertically for contact when the wedge slides downward.

When the mold is in its molding position as shown in FIG. 1(a), the parts of the mold are situated to form a molding volume with smooth upper and lower surfaces 322 and 324, downwardly extending portions 326 and 328 and indentation 315. The mold in FIG. 1 parts along parting line 310.

After a material has been introduced into the molding volume and been given time to harden into piece 312, it can be seen that it would be impossible to eject the piece vertically with ejection pin 316. This is because indentation 315 causes the formation of a protrusion 314 in piece 312. This protrusion locks the piece into the mold.

FIG. 1(b) shows how the piece is released. Upper member 306 is moved upwardly away from lower member 308. At the same time, wedge 302, which is slidably attached to lower member 308, is caused to slide downward. The downward motion of wedge 302 causes the protrusion 318 thereon to contact the protrusion 320 on Flipper 304. This contact causes flipper 304 to pivot counterclockwise about its pivot 330. The pivoting action releases the protrusion 314 from indentation 315 and the piece can be ejected, as shown in FIG. 1(c).

Figure 2:
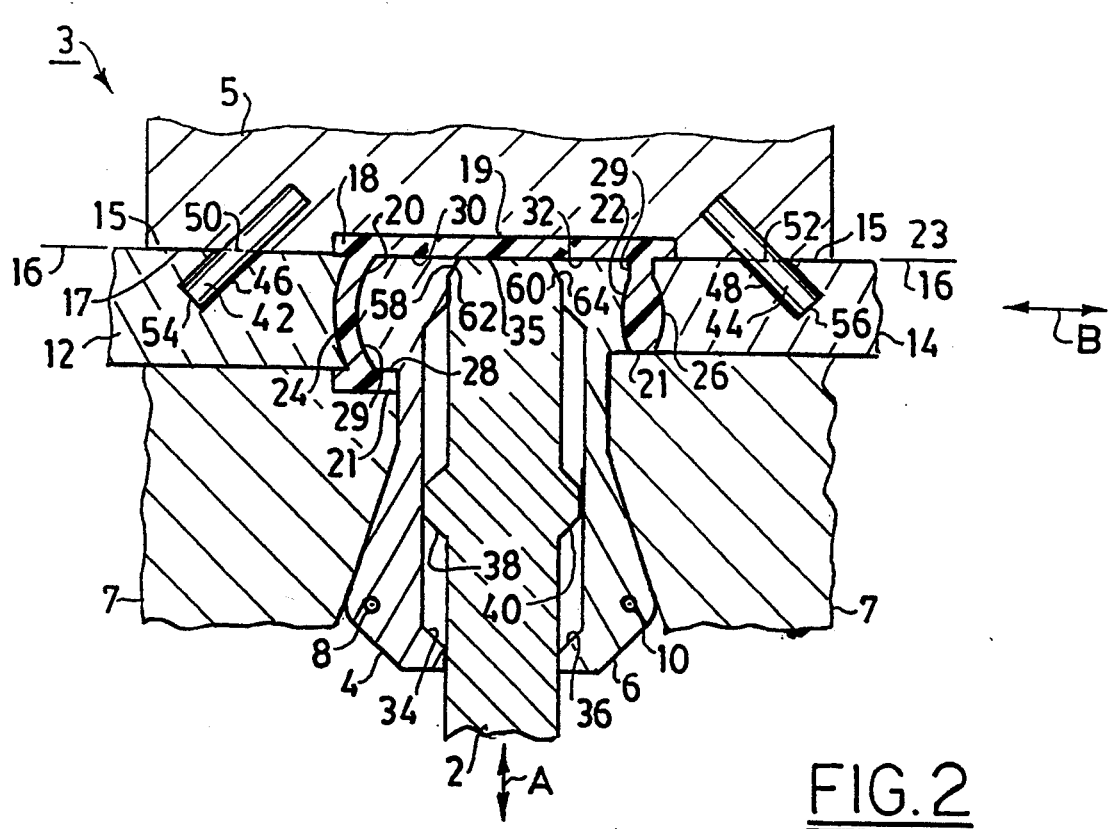
FIG. 2 is a side cross-sectional view of a portion of a preferred molding apparatus in accordance with the present invention.
Figure 6:
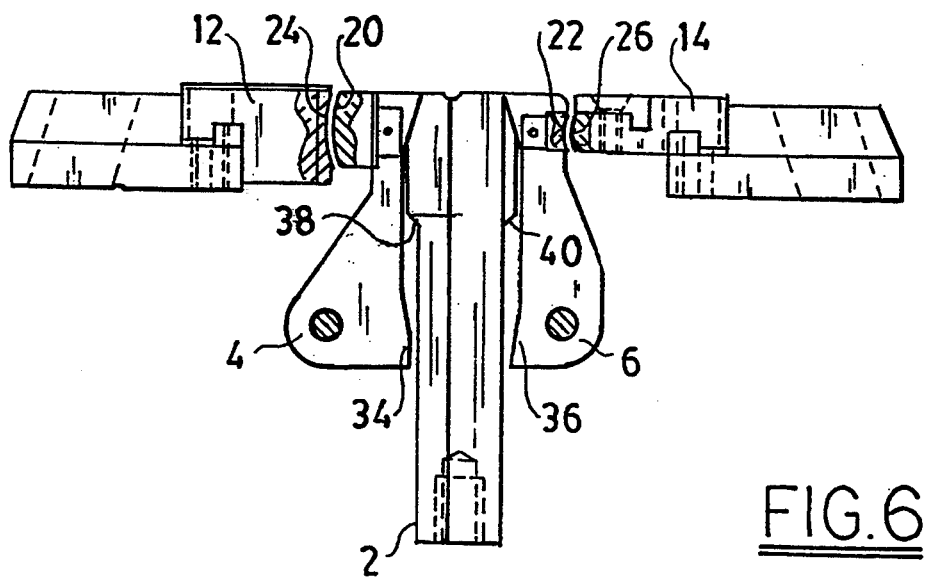
FIG. 6 is a cross-sectional view of a flipper and wedge mechanism.
Figure 11:
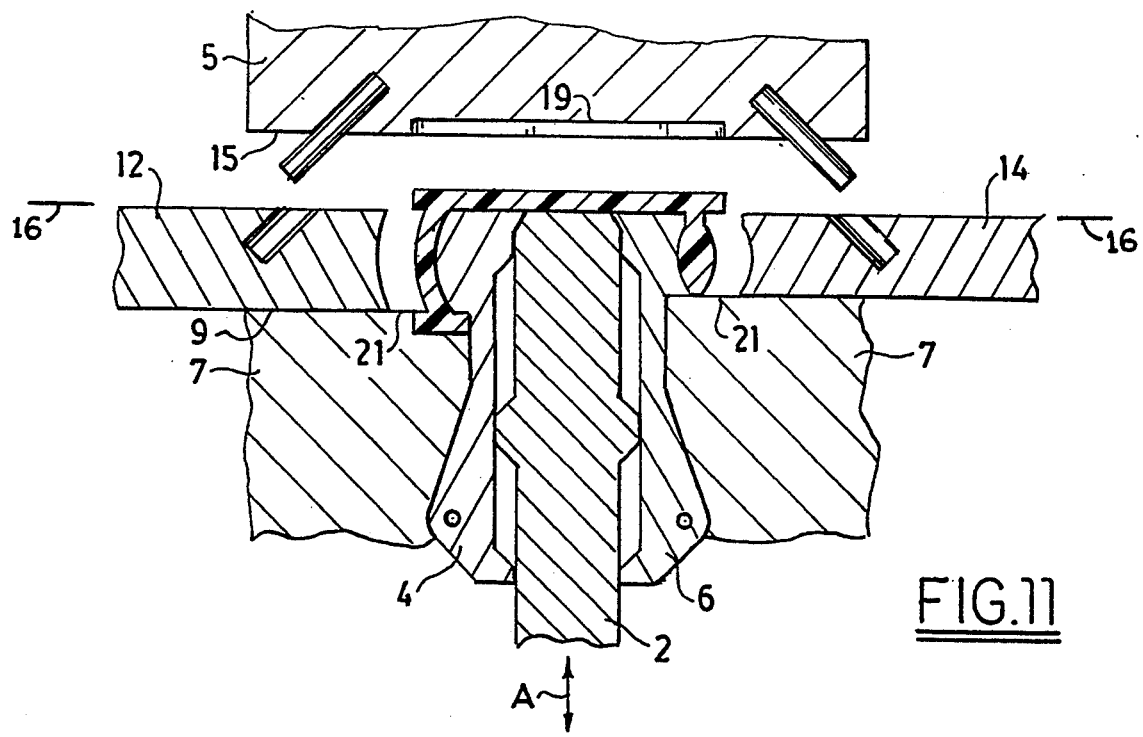
FIG. 11 is a cross-sectional view of the mold of FIG. 2 in its release position.

FIGS. 2 and 6, and 11 show side views of a preferred molding apparatus in accordance with the present invention. Common reference numbers are used in FIGS. 2 and 6 to refer to common elements. Referring to FIG. 2, mold 3 can be used to produce a viewfinder system in accordance with the present invention in a single molding operation. Mold 3 includes upper molding member 5 and lower molding member 7. Member 5 includes bearing surface 15, and members 5 and 7 include molding surfaces 19 and 21, respectively. These surfaces can best be seen in FIG. 11. Members 5 and 7 are separable at parting line 16. When the members are closed together, as shown in FIG. 2, the mold is in its molding position. Members 5 and 7 can be separated along parting line 16, and the mold can then assume a release position, as shown in FIG. 11. Mold 3 also includes wedge 2, which is attached to lower molding member 7 and is slidable in the direction shown by arrow A. Flippers 4 and 6 are also attached to lower member 7, and each is pivotable about pivot points 8 and 10.

Flippers 4 and 6 have attached thereto lens-forming nubbins 20 and 22, respectively. Slides 12 and 14 are mounted to the upper surface 9 of lower member 7 and are slidable in the direction indicated by arrow B. Slides 12 and 14 have attached thereto a lens forming nubbin 24 and 26, respectively, positioned adjacent lens nubbins 20 and 22, respectively, on flippers 4 and 6. Slides 12 and 14 have respective upper bearing surfaces 17 and 23, which bear against bearing surface 15 of upper member 5 when the mold is in its molding position as shown in FIG. 2.

As shown in FIG. 2, the molding surfaces of upper and lower members 5 and 7 form a portion of molding volume 18. The boundaries of the molding volume are further defined by lens nubbins 20, 22, 24 and 26, sides 28 of flipper 4, upper surfaces 30 and 32 of flippers 4 and 6, and the upper surface 35 of wedge 2. The molding volume is in the shape of the viewfinder of the present invention.

When mold 3 is in the molding position, lens forming material is introduced, for instance by injection, into molding volume 18 by means of a gate, not shown. The material conforms to the shape of the volume, filling all the voids and spaces within the volume. After volume 18 has been completely filled with the lens forming material, the material is cooled and thus hardened. The hardened material permanently assumes the shape of the volume 18, which is in the shape of the viewfinder of the present invention.

The hardened material, now the viewfinder, is then removed from mold 3. The molding volume 18 contains several regions which result in the formation of what are known as "undercuts". Undercuts are indentations in the molding volume which would prevent the molded material from being removed from the mold in a vertical fashion without destroying the mold or the viewfinder. Each of the undercuts is associated with a lens nubbin, and each is indicated by points 29 in FIG. 2.

The apparatus and method of the present invention provide means for releasing the undercut portions of the viewfinder to allow it to be removed without damage. In a preferred embodiment, the viewfinder is removed by moving the lens nubbins away from the view finder.

Figure 12:
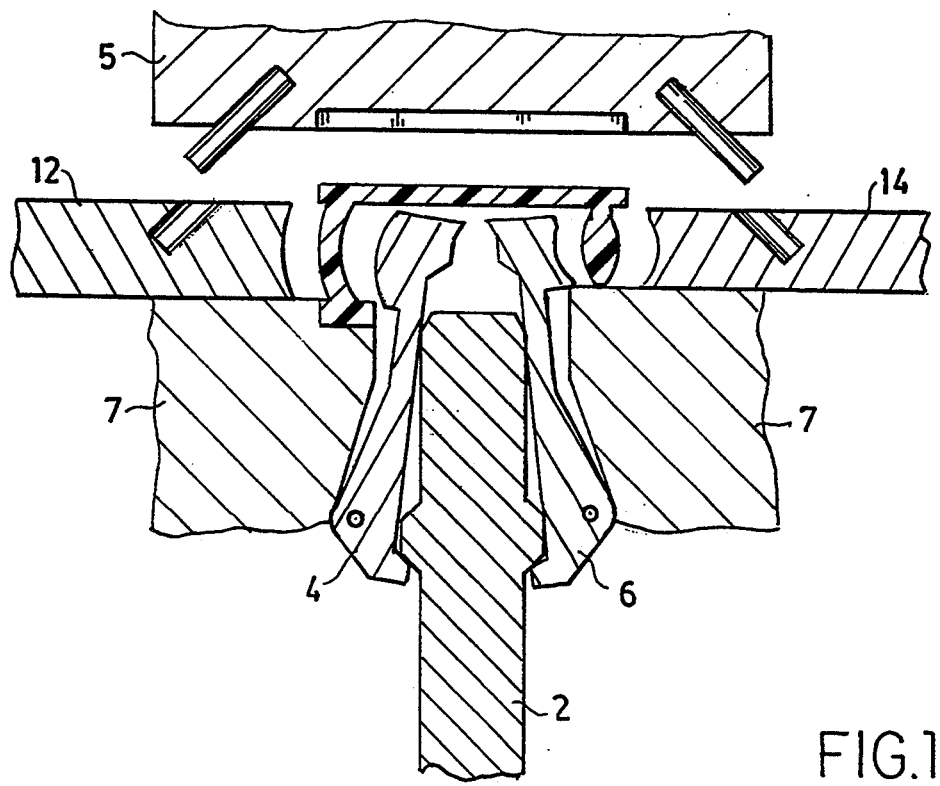
FIG. 12 is another cross-sectional diagram of the mold of FIG. 2 in its release position.

The lens nubbins 20 and 22 are removed from contact with the viewfinder by means of the interaction of flippers 4 and 6 and wedge 2. As can be seen clearly in FIG. 6, Flippers 4 and 6 have projections, 34 and 36, respectively. The projections 34 and 36 are disposed in the path of motion of projections 38 and 40 of wedge 2. To retract lens nubbins 20 and 22 from the viewfinder, wedge 2, which is slidably attached to lower molding member 7, is caused to slide downward from its molding position, as shown if FIG. 2, to its release position, as shown in FIG. 12. The downward sliding action causes the protrusions 38 and 40 of wedge 2 to come into contact with protrusions 34 and 36, respectively, of flippers 4 and 6. This contact causes a caming action on flippers 4 and 6, whereby flippers 4 and 6 pivot about pivot points 8 and 10. This pivoting action directs lens nubbins 20 and 22 away from the surfaces of the lenses on the formed viewfinder. Thus, the undercuts 29 associated with lens nubbins 20 and 22 are released. While the preferred embodiment has been described with the wedge sliding, a preferred embodiment can also provide for the wedge remaining stationary and the lower member moving relative to the wedge. As long as the relative motion between the wedge and lower molding member is as described above, the mold of the present invention will operate as described.

Figure 7C:
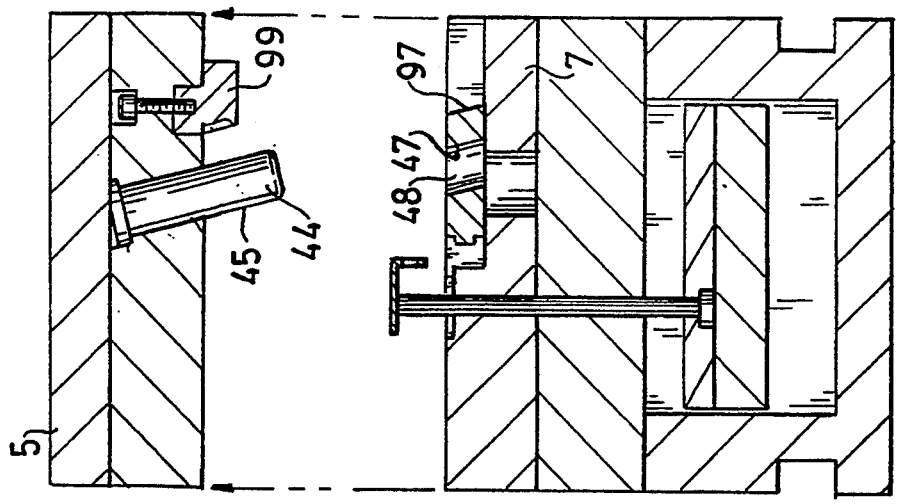
FIG. 7(a), 7(b) and 7(c) are sequential views of the slide mechanism of the mold of the present invention.
Figure 7B:
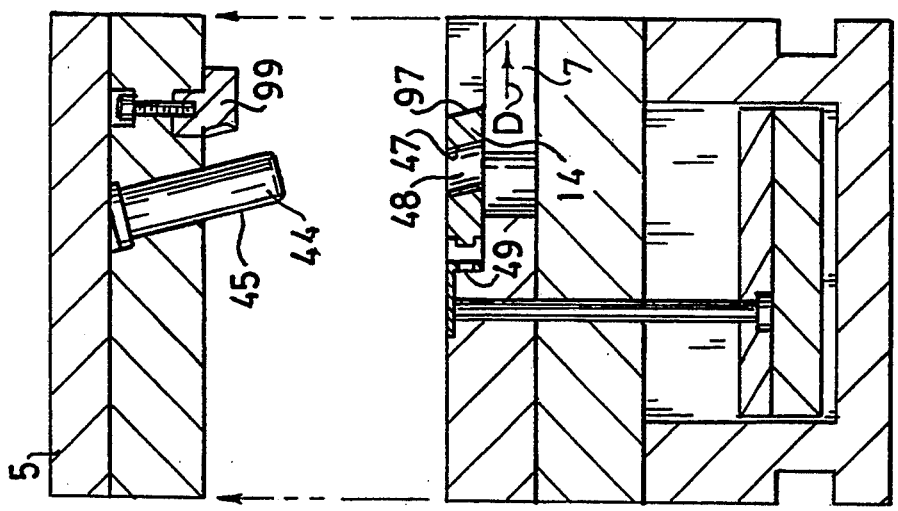
Figure 7A:
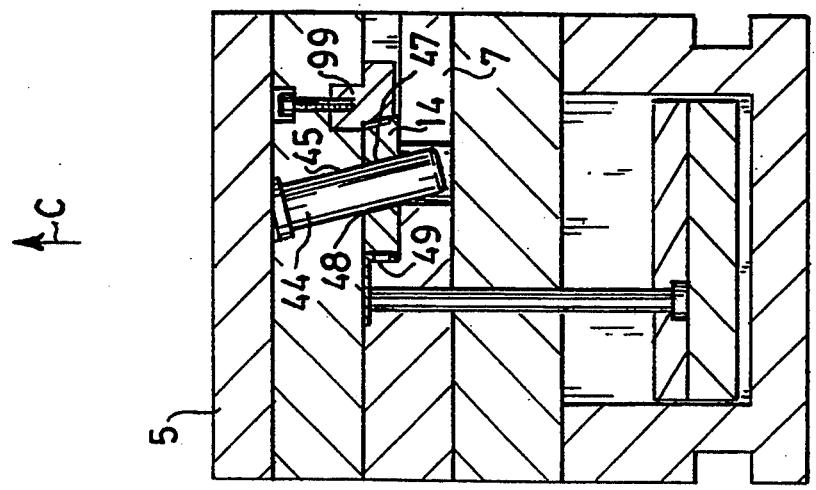

As can also be seen in FIG. 2, undercuts 29 formed by lens nubbins 24 and 26 also restrict the release of the hardened material from mold 3. Movement of lens nubbins 24 and 26 away from the formed lens surfaces is necessary to release the viewfinder. Lens nubbins 24 and 26, which are attached to slides 12 and 14, respectively, are moved away from the formed lens surfaces by moving slides 12 and 14 away from molding volume 18. Means for moving slides 12 and 14 are provided by the pins 42 and 44, which extend from the bearing surface 15 of upper member 5, and openings 46 and 48 in the upper surfaces of slides 12 and 14. Pins 42 and 44 have bases 50 and 52 and ends 54 and 56, and are angled away from the molding volume 18. The angling of the pins away from molding volume 18 results in the bases 50 and 52 being disposed closer to the molding volume than ends 54 and 56. When the bearing surfaces of upper and lower members 5 and 7 are joined at parting line 16, pins 42 and 44 are fully inserted in openings 46 and 48. Openings 46 and 48 are each angled in the same direction as pins 42 and 44, thus resulting in a complementary fit of the pins and openings. Referring to FIG. 7(a)-(c), final molding position is achieved by means of cam lock 99, which interfaces with surface 97 of slide 14. Cam lock 99 positions slide 14 in its molding position. In this fully inserted position, the openings 46 and 48 are aligned with the perimeter of the bases 50 and 52, and therefore slides 12 and 14 are positioned at their closest positions to the molding volume 18. When upper and lower members 5 and 7 are separated at parting line 16, pins 42 and 44 are raised. This casing action causes the exterior sides (relative to the center of the pin and the center of the mold) of the pins to bear against the walls of openings 46 and 48. This bearing action exerts an outward force on slides 12 and 14, which then slide in the direction of the force, releasing lens nubbins 24 and 26 from the molded lens surfaces of the viewfinder. The slides in their retracted positions can be seen in FIG. 11. When all lens nubbins have been retracted from the viewfinder, the viewfinder is free to be ejected from the mold.

Mold 3 is restored to its molding position as follows. To return lens nubbins 20 and 22 to their molding position, wedge 2 is moved upward. The upward motion causes surfaces 58 and 60 of the upper portion of wedge 2 to contact surfaces 62 and 64 of flippers 4 and 6. This contact forces the flippers to pivot about pivot points 8 and 10, and lens nubbins 20 and 22 are returned to their molding position.

Lens nubbins 24 and 26 are returned to their molding positions by repositioning upper and lower molding members 5 and 7 such that their bearing surfaces are in contact. When upper member 5 is lowered toward lower member 7, pins 42 and 44 are returned to openings 46 and 48. The interior sides (relative to molding volume 18) pins 42 and 44 contact the walls of openings 46 and 48 and exert an inward force on slides 12 and 14. This inward force causes the slides to move toward the molding volume and lens nubbins 24 and 26 are thus returned to their molding positions. A sequential view of the operation of a slide mechanism is shown in FIG. 7.

FIG. 7(a) shows the mold in its molding position. Pin 44 is fully inserted into opening 48. As upper member 5 is drawn in the direction of arrow C in FIG. 7(a), the exterior side 45 of pin 44 bears against the wall 47 of opening 48. This contact drives slide 14 in the direction of arrow D in FIG. 7(b). The undercut 49 being released, the piece is free to be ejected, as shown in FIG. 7(c). If the sequence is reversed, the mold is returned to its molding position.

To obtain lenses of suitable optical quality without the need for post-molding buffing, the lens nubbins are provided with surfaces which are highly polished. These highly polished surfaces, which constitute the lens-forming elements of the mold, provide a suitable finish to the resulting lenses. Lens nubbins 20, 22, 24 and 26 preferably are constructed of steel, but any material which can be suitably polished and which can withstand the high molding temperatures without deformation is acceptable. To obtain a suitable finish on the lens surfaces, it is preferable that the surfaces of the lens nubbins have roughness characteristics as shown in Table 1.

TABLE 1

| Lens Nubbin Corresponding to Surface | Power | Irregularity | Asphericity |
|---|---|---|---|
| 110, 114, 116* (spherical) | 2½ waves | ≦½ wave | ≦½ wave |
| 112* (aspherical) | 1-2 waves | ≦½ wave | ≦½ wave |
| Surface Roughness | | | |
| 10-200 Å rms | | | |
| 50-300 Å rms | | | |

Figure 5:
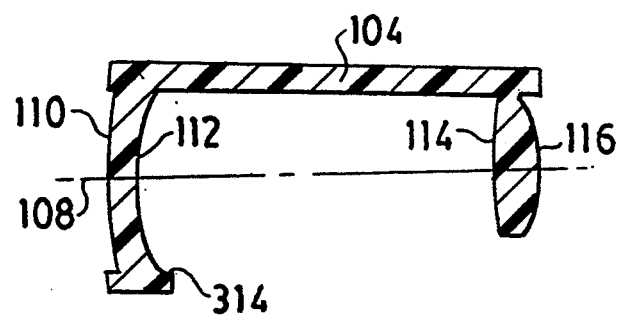
FIG. 5 is a sectional view of the system of FIG. 4.
Figure 13:
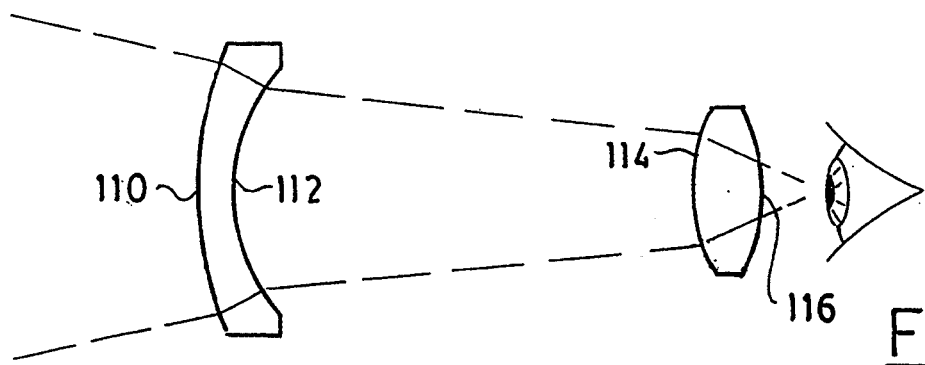
FIG. 13 is a schematic view of the viewfinder system of the present invention.

*See FIGS. 5 and 13.

The rest of the mold elements preferably are constructed from high carbon steel, but any material capable of withstanding the pressure and temperature levels associated with the above-described mold and process will suffice. Acceptable materials for constructing the viewfinder system of the present invention are any moldable materials of a proper refractive index suitable to form optical lenses. The preferred material is a clear polycarbonate. Tinted polycarbonate can also be used for applications requiring tinted lenses. Other suitable materials include tinted or clear acrylic, polystyrene, thermoplastic polyesters, olefin, or any transparent moldable material.

Figure 3:
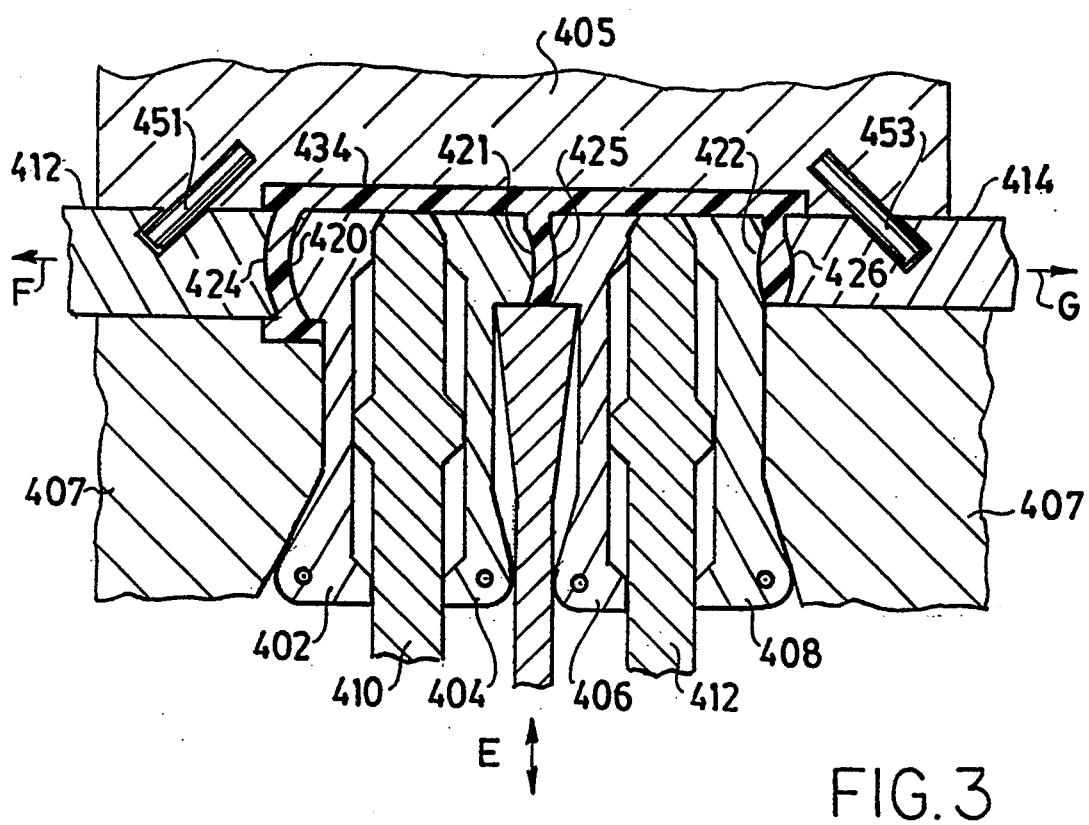
FIG. 3 is an alternative embodiment of a molding apparatus in accordance with the present invention.

While the mold and process of the present invention each have been described for the molding of a two lens viewfinder system, the mold and process can be adapted for molding viewfinders having three or more such lenses. This can be accomplished by including more wedges, 410 and 412, and flippers, 402, 404, 406 and 408 as shown in FIG. 3. Such an arrangement can accommodate the production of three lenses in a viewfinder system. The operation of this embodiment is the same as that of the embodiment shown in FIG. 2. Upper member 405 and lower member 407, when in their relative positions as shown in FIG. 3, create a molding volume 434. The volume is further defined by lens nubbins 420, 421,425 and 422 attached to flippers 402, 404, 406 and 408, respectively, and lens nubbins 424 and 426, attached to slides 412 and 414 respectively. To release the undercuts, the relative movement of the wedges to the flippers is in the direction of arrow E. This causes the flippers to pivot and the undercuts associated with the flippers are released. Also, slides 412 and 414 are moved in directions F and G, respectively, by means of the pin and opening mechanisms 451 and 453, which operate in the same manner as the similar mechanism described with respect to FIG. 7. The mold and process can be adapted to produce a limitless number of such lenses.

The invention has been described in a preferred embodiment as providing for retraction of lens nubbins 20 and 22 from the lens surfaces by means of pivoting flippers 4 and 6 about pivot points 8 and 10 (FIG. 2). However, the lens nubbins can alternatively be retracted by other means. For instance, a pneumatic retraction system can be used. Upon actuation, the pneumatic device would move the lens nubbins away from the lenses. Also, retraction can be performed manually. Other means can include a manual slide mechanism, which provides a drawing action to relieve the undercuts of the lens nubbins during an ejection, or various types of hydraulic, screw thread, or electromagnetic action, which can retract the lens nubbins prior to viewfinder ejection. These same alternative retraction methods can be adapted to retract slides 12 and 14 as well.

Figure 4:
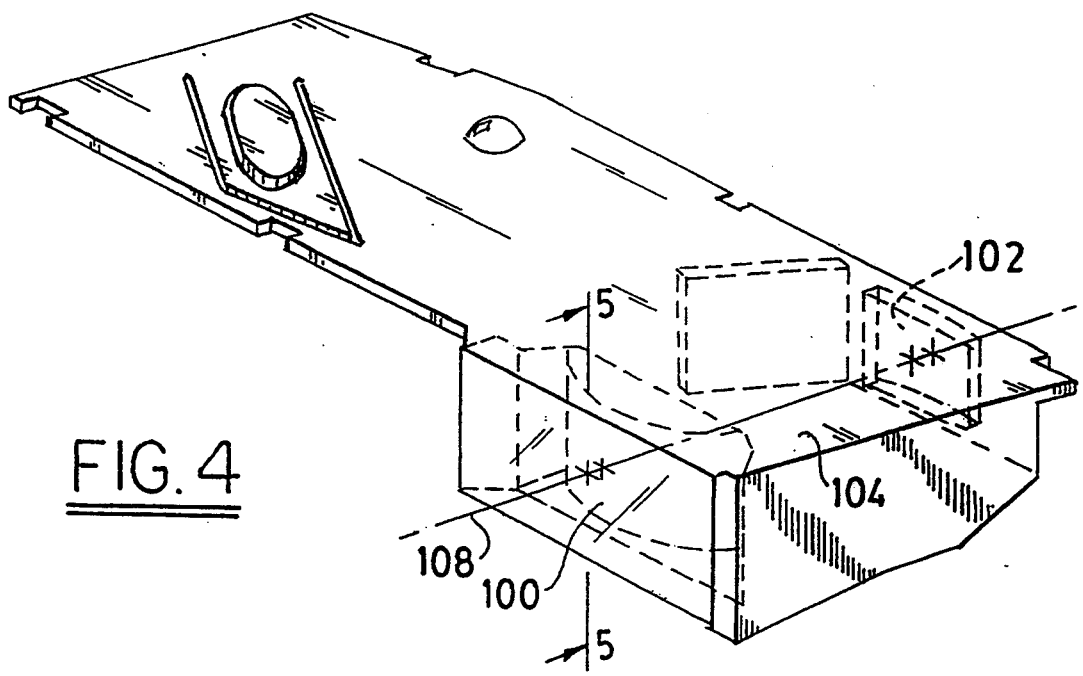
FIG. 4 is a perspective view of the viewfinder system made in accordance with the method of the present invention and adapted for use in a single-use camera.

FIGS. 4 and 5 show a preferred embodiment of the viewfinder of the present invention. As can be seen, a front lens 100 and rear lens 102 extend perpendicularly downward from support 104. Front and rear lenses 100 and 102 and support 104 are integrally formed from a common material. The front and rear lenses are in optical alignment along principal axis 108. In the embodiment shown in FIG. 4, the viewfinder system is part of an integrated upper surface of a single use camera.

FIG. 5 is a sectional view of the viewfinder of FIG. 4, showing the shapes of lenses 100 and 102. A preferred embodiment of the view finder can be described in terms of the geometry of the lens surfaces 110, 112, 114 and 116 (also shown in FIG. 13). Table 2 includes this descriptive data:

TABLE 2

| Surface* | Top-Bottom (mm) | Length Side-Side (mm) | Radius (mm) |
|---|---|---|---|
| 110 | 8.34 | 25.80 | 55.8727 |
| 112 | 7.84 | 22.05 | Aspherical |
| 114 | 3.06 | 11.27 | 183.336 |
| 116 | 2.96 | 10.83 | −53.3716 |

Figure 14:
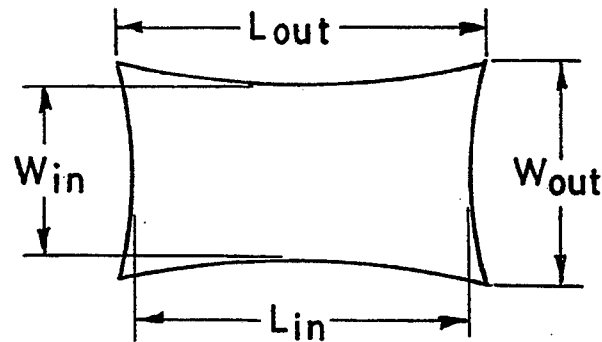
FIG. 14 is a schematic view of one of the lenses of the view finder shown in FIG. 13.

*See FIGS. 5 and 14.

The thickness of front lens 100 preferably is 1.250 mm along its principal axis 108 and the thickness of rear lens 102 along the axis is 2.000 mm. The distance between the front and rear lenses is approximately 32.250 mm. The length of the viewfinder from surface to surface 116 is approximately. 35.500 mm. The geometry described yields a 0.5 × panoramic viewfinder having the following characteristics:

| | |
|---|---|
| Apparent half field = | 16.9° |
| Half Field = | 31.4° |
| Eye Relief = | 21 mm |

The aspheric equation for this system, $$X = cy^2/(1+(1-(K+1)c^2y^2)^{\frac{1}{2}}),$$

has the following variable values:
C = 0.068348
K = −0.419061
Vertex Radius = 14.6310

The viewfinder aberrations over the finder field 16.9 at eye can be described as follows:

| Field | Accommodation (Diopters) | Astigmatism (Diopters) | Distortion (%) | Lateral Color (Minutes of Arc) |
|---|---|---|---|---|
| Axis | −.700 | 0 | 0 | 0 |
| Top | −.703 | .045 | −.03 | 4.03 |
| Side | −.901 | .177 | −.07 | 12.74 |
| Corner | −.952 | .170 | −.06 | 13.65 |

Wherein negative astigmatism means the tangential field is closer to the eye. Other pertinent data associated with this embodiment are:

Viewfinder convergence = −0.7 diopter
Illumination format is 13.3 × 36.4
Print format is 11.85 × 33.82
Field coverage corresponds to 85% field for a 25 mm taking lens in the camera.

The surface 110 aperture can better be defined with reference to FIG. 14 (which is a front view of surface 110), wherein:
Win = 8.341 mm
Lin = 25.795 mm
Wout = 8.644 mm
Lout = 26.134 mm Another embodiment of a viewfinder in accordance with the present invention can be molded in the form shown in FIGS. 8–10.

Figure 8:
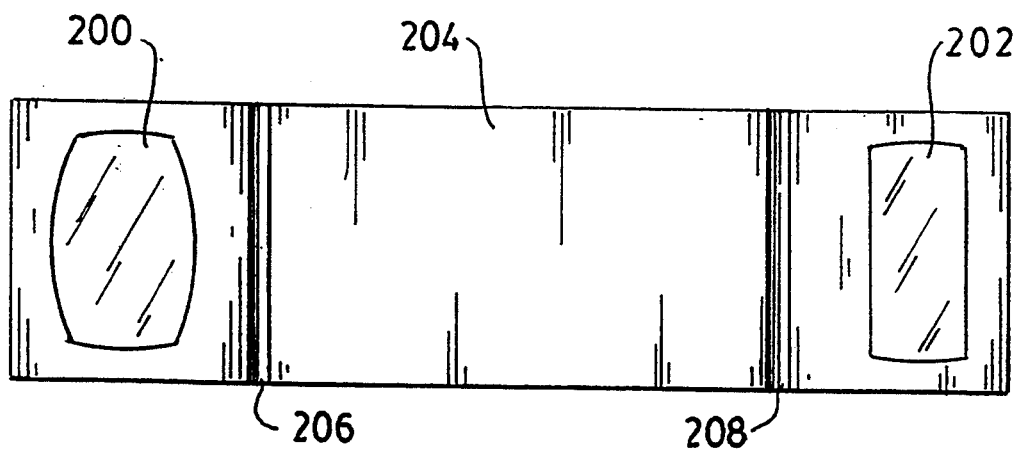
FIG. 8 is a plan view of a viewfinder in accordance with the present invention.
Figure 9:
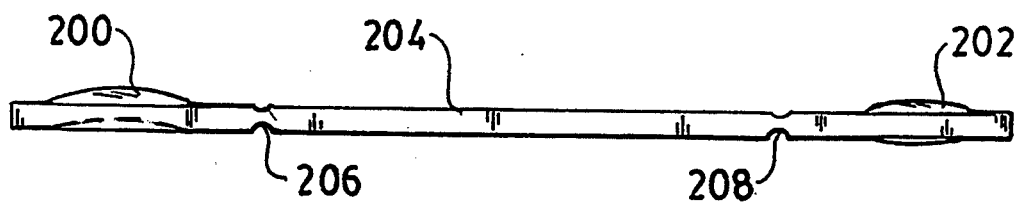
FIG. 9 is a side view of the viewfinder of FIG. 8.
Figure 10:
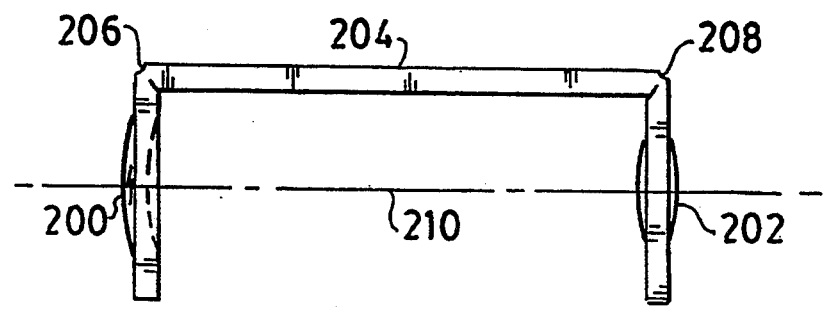
FIG. 10 is a side view of the viewfinder of FIG. 8 in which the lenses have been positioned in optical alignment.

The viewfinder shown in FIGS. 8-10 is one in which the lenses 200 and 202 and support 204 are formed in a single plane in a single molding process. In this embodiment, the lenses 200 and 202 are each attached to opposite ends of support 204 by living hinges 206 and 208. FIG. 9 shows a side view of this configuration. To form an optical viewfinder system, lenses 200 and 202 are bent toward each other such that they are aligned along a common principal axis 210, as shown in FIG. 10.

Figure 15:
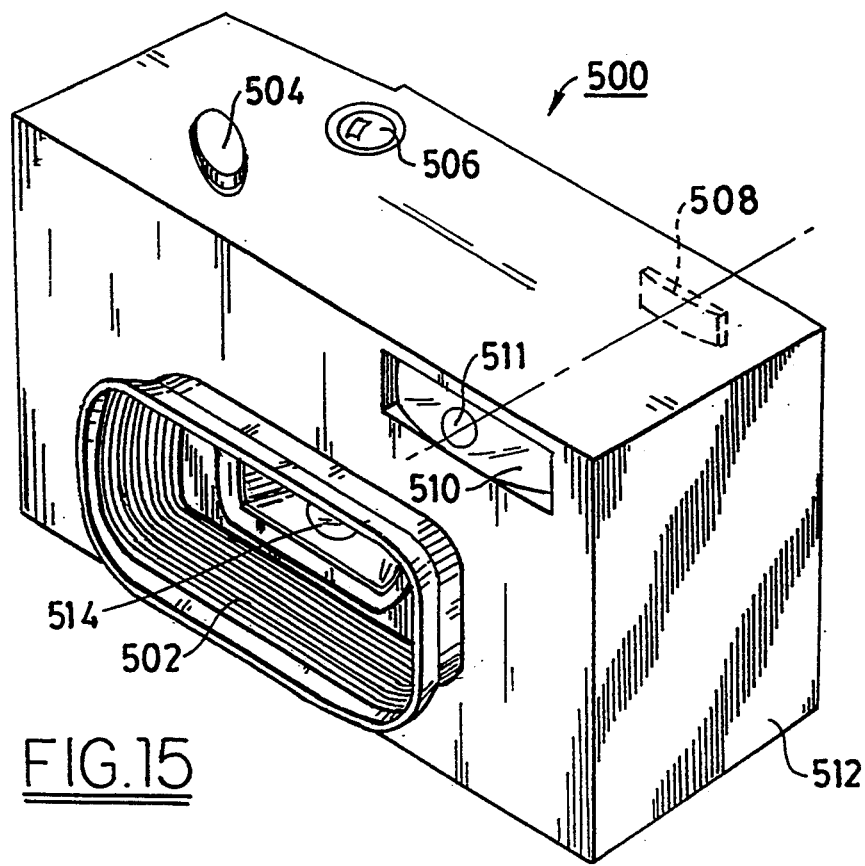
FIG. 15 shows a single-use camera containing a dual lens viewfinder in accordance with the present invention.

A single use camera 500 containing a dual lens viewfinder in accordance with the present invention is shown in FIG. 15. The camera includes lens hood 502, shutter release 504, counter window 506, rear and front viewfinder windows 508 and 510, respectively, and inner box 512.

Box 512 encloses the camera and preferably is made of cardboard. Box 512 can have written instructions thereon to inform a user of the proper operation of the camera. The box 512 also has a plurality of openings to allow the user access to the operational features of the camera. Specifically, there are openings for the shutter release 504, the counter window 506, the viewfinder lenses 508 and 510, and the taking lens 514 and lens hood 502. Lens 510 can have etched thereon an aiming means 511, which can be a ring.

Figure 16:
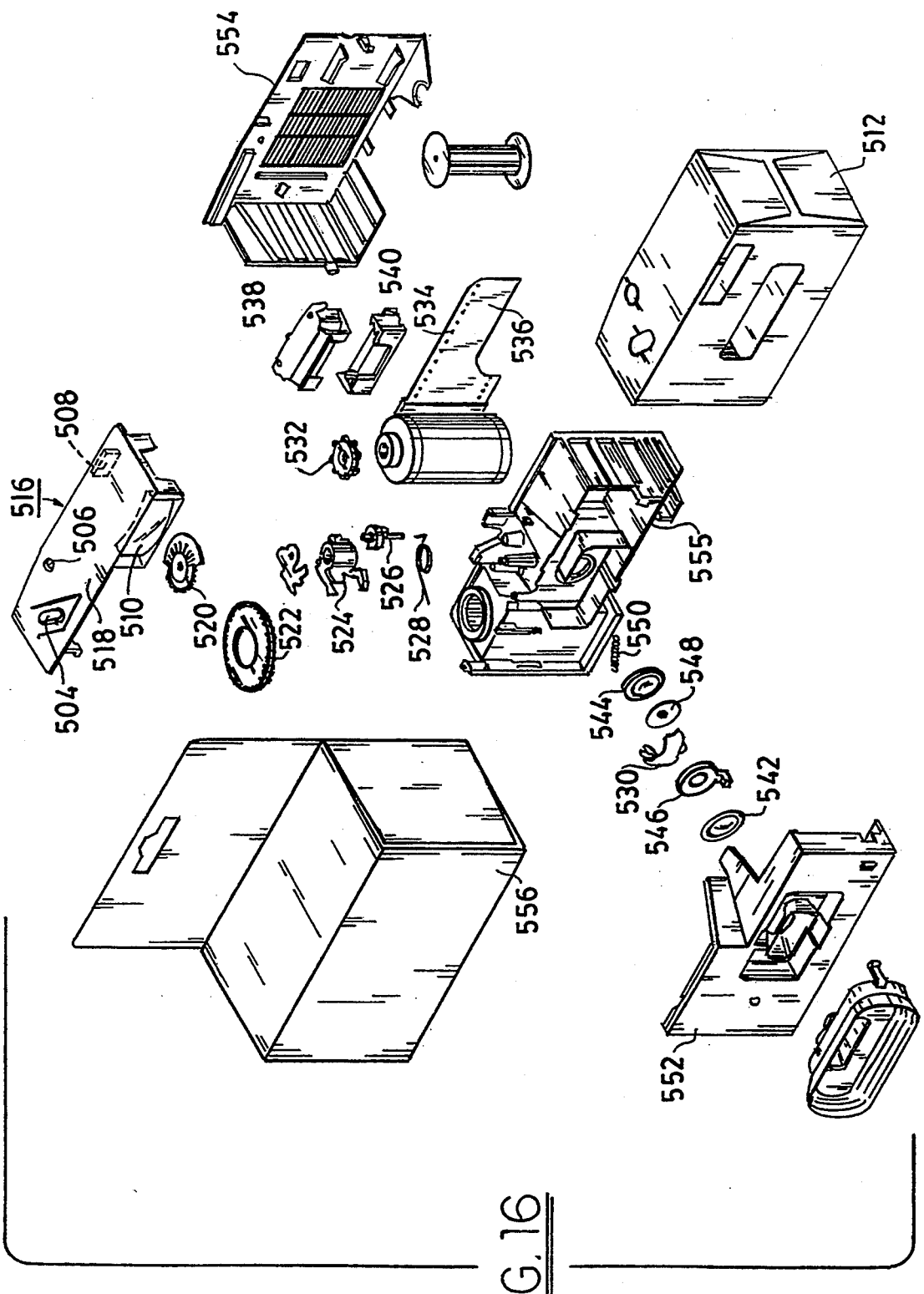
FIG. 16 is an exploded view of the single-use camera of FIG. 15.

FIG. 16 shows an exploded view of the single use camera of FIG. 15. The camera includes top cover 516, which includes rear and front viewfinder lenses 508 and 510. Top cover 516 also includes support 518, which acts as the upper surface of the camera and has integrally formed therein the frame counter window 506, which can have magnification capability, and shutter release 504.

The camera also includes frame counter 520, which displays to the user the number of frames exposed to date. Thumb wheel 522, which is attached to counter 520, allows the user to manually advance the film when a frame has been exposed. Metering lever 524 positions film in place in the camera so that the image to be photographed is centered on the frame. High energy lever 526 and spring 528 cooperate to impact the shutter blade to allow light to reach the film frame. Sprocket and cam assembly 532 operate with the perforations 534 on film 536 to guide the film when it is advanced. Baffle elements 538 and 540 create a unique aspect ratio to give an optically aided effect to the image to be captured on film.

The shutter and lens system of the camera 500 has the following elements. Outer lens 542 and inner lens 544 have interposed therebetween spacer 546, which spaces the lenses a desired distance apart, shutter blade 530, which allows light to pass through inner lens 544 and onto the film, and aperture 548, which meters the intensity of light allowed into the camera. Shutter spring 550 provides the energy required to close shutter blade 530.

The elements of the camera are housed by the front cover 552, the rear cover 554, the frame 555, and the top cover 516, which come together to form a box-like camera. Assembly of the front cover 552, the rear cover 554 and the frame 555 results in the formation of side covers 597 and 599 and bottom cover 595. The camera is then enclosed by the cardboard inner box 512. Outer box 556 acts as a display package.

While the invention has been described with reference to the viewfinder's use in a single-use camera, the mold, process and viewfinder of the invention can be modified for use in the production of lenses for other applications. For instance, a viewfinder in accordance with the present invention can be used in any application which requires an optical sight, such as a gun sight, binoculars, reusable cameras, etc.

EXAMPLE

The following test data were compiled during the molding of optical viewfinders using the mold and methods of the present invention. The molding process was conducted with a Mold Master system using polycarbonate resin.

| PROCESS MONITOR | | | | |
|---|---|---|---|---|
| | | Historical | | |
| | Actual | Low | Ave | High |
| Cycle Time | 45.5 S | 20.1 S | 36.7 S | 57.3 S |
| Fill Time | 0.35 S | 0.25 S | 0.33 S | 0.91 S |
| Recovery Time | 1.79 S | 0.66 S | 1.67 S | 2.98 S |
| Cushion Position | 0.19 in. | 0.02 in. | 0.16 in. | 0.33 in. |
| Hydraulic Transfer | 1917 psi | 1262 psi. | 1866 psi. | 2393 psi. |
| Temperatures | | | | |
| Nozzle (540–650) | 570 DEG F. (540–650) | | Zone 1 | 570 DEG F. |
| (540–650) | | | Zone 2 | 560 DEG F. |
| (540–650) | | | Zone 3 | 550 DEG F. |
| Alarm Band (540–650) | 20% | | Hot Runner | 570 DEG F. |
| Feedthroad (42–250) | 130 DEG F. | | Mold Temp | 230 DEG F. |
| Timers | | | | |
| Cycle Alarm Limit | 60.0 SEC | | Cooling | 25.00 SEC |
| Inject High | 1.00 SEC .5–10 | | Extruder Delay | 5.00 SEC |
| Pack | 3.00 SEC 1–10 | | Open Dwell | 2.00 SEC |
| Hold | 2.00 SEC 1–10 | | | |

| Injection Control Data - Material Through Gate | | | |
|---|---|---|---|
| Shot Size | 0.68 IN | INJ HI PRS LMT | 2400 psi Pack 1 1850 psi 1400–2400 |
| Velocity 1 | 2.00 IN/SEC | HYD XFER PRS | 1900 psi Pack 2 1800 psi 1400–2400 |
| Velocity 2 | 2.00 IN/SEC | | |
| Switchpoint 2 | 40% | | |
| Velocity 3 | 2.00 IN/SEC | | |
| Switchpoint 3 | 20% | CUSHION | 0.35 IN remaining |
| Velocity 4 | 1.85 IN/SEC | | |
| Transfer Pos | 0.23 IN | | |

| SET UP SHEET | | | |
|---|---|---|---|
| Peripheral Equipment | | | |
| MOLD TEMPERATURE CONTROLLERS | | | |
| | HIGH LIMIT F. DEG | SETPOINT F. DEG | LOW LIMIT F. DEG |
| Mold Temp #1 | 10 | 185–250 | 10 |
| Mold Temp #2 | 10 | 111–250 | 15 |
| Mold Temp #3 | 9 | 150–250 | 12 |
| Mold Temp #4 | 10 | 150–250 | 13 |
| Mold Temp #5 | 5 | 72–250 | 5 |
| Mold Temp #6 | 12 | 150–250 | 15 |
| Mold Temp #7 | 13 | 150–250 | 16 |
| Mold Temp #8 | 14 | 150–250 | 17 |
| DRYERS | | | |
| | HIGH LIMIT F. DEG | SETPOINT DEG F. | LOW LIMIT F. DEG |
| Dryer #1 | 40 | 160–320 | 40 |
| Dryer #2 | 22 | 222 | 5 |

| EXTRUDER CONTROL DATA | | | |
|---|---|---|---|
| Extruder Speed Init | 20% | Back Pressure Init | 50 PSI |
| Extruder Speed Final | 10% | Back Pressure Final | 50 PSI |
| | Decompress Distance 0.00 IN | | |

The invention has been described in detail with particular reference to the preferred embodiments thereof, but it will be understood that variations and modifications can be effected within the spirit and scope of the invention.

We claim:

1. A unibody viewfinder, comprising:
   a support; and
   at least two optical lenses aligned along a common principal axis, said lenses being integral with said support by simultaneously molding together said lenses and said support from a common material in a single molding process.

2. The viewfinder according to claim 1, wherein said lenses are aligned along the common principal axis during said molding process.

3. The viewfinder according to claim 1, wherein one or more of said lenses each are attached to said support by a living hinge.

4. The viewfinder according to claim 3, wherein said lenses are aligned along said principal axis by pivoting said lenses about said living hinges.

5. The viewfinder according to claim 1, wherein said viewfinder has at least one projection and wherein said molding of said lenses and said support comprises:
   solidifying said lens forming material in a mold, whereby the lens forming material is hardened to form said viewfinder;
   removing said viewfinder from said mold; and
   characterized by introducing a lens forming material into said mold having inner surfaces defining a molding volume in the shape of said viewfinder, said inner surfaces including a plurality of pairs of highly polished surfaces for molding opposite surfaces of said lenses.

6. The viewfinder according to claim 5, wherein said plurality of pairs of highly polished surfaces are provided by a plurality of pairs of lens nubbins, at least one of said lens nubbins forming an undercut corresponding to said projection, the highly polished surfaces of each pair of lens nubbins facing one another to define a region in said mold in which said lenses are formed.

7. The viewfinder according to claim 6, wherein said removing said solidified material comprises:
    moving each lens nubbin of said pair of lens nubbins away from its associated lens, whereby said projection is released and does not prevent said viewfinder from being removed from said mold.

8. The viewfinder according to claim 7, wherein each lens nubbin of a pair is juxtaposed to the other.

9. The viewfinder according to claim 7, wherein one lens nubbin of a pair moves in one direction and the other lens nubbin moves in the opposite direction.

10. The viewfinder according to claim 7, wherein at least one of said lens nubbins is attached to a flipper which is pivotally attached to said mold, and wherein said moving each lens nubbin comprises pivoting said flipper in a direction such that said attached lens nubbin moves away from its associated lens.

11. The viewfinder according to claim 9 wherein said mold comprises a plurality of said flippers, said flippers being pivotable in opposite directions, respectively, to form a molding and a release position.

12. The viewfinder according to claim 7, wherein at least one of said lens nubbins is attached to a sliding member slidingly attached to said mold, and wherein said moving each lens nubbin comprises sliding said sliding member away from its associated lens.

13. The viewfinder according to claim 11, wherein said mold further comprises a plurality of slides, and slides sliding in opposite directions, respectively, to form a molding and a release position.

14. The viewfinder according to claim 7, wherein said mold further comprises one or more wedges slidingly attached to said mold and situated in slidable contact between different ones of said pairs of lens nubbins, said flippers and said wedges each having at least one protrusion thereon, the protrusions on said wedge and said flippers being aligned such that sliding said wedge causes the protrusions on said wedge to contact the protrusions on said flippers.

15. The viewfinder according to claim 13, wherein said pivoting said flipper comprises:
    sliding said wedge to cause one of the protrusions thereon to contact the protrusion on one of said flippers, whereby said flipper pivots to move said attached lens nubbin away from its associated lens, releasing said projection.

16. The viewfinder according to claim 1, wherein said support and lenses are made of polycarbonate.

17. The method according to claim 1, wherein said support and lenses are made of acrylic.

18. The viewfinder according to claim 1, wherein said support and said lenses are made of a thermoplastic polyester.

19. The viewfinder according to claim 1 wherein said support and said lenses are made of a transparent moldable material.

20. The viewfinder according to claim 1, wherein said support and said lenses are made of polystyrene.

21. The viewfinder according to claim 1, wherein said support is surface of a single-use camera.

22. In an apparatus for capturing images on photographic film by exposing said film to light, said film being prepackaged within said apparatus, a viewfinder system, comprising:
    a unibody viewfinder having a support and at least two lenses; and
    said lenses aligned along a common principal axis, said lenses being integral with said support by simultaneously molding together said lenses and said support from a common material in a single molding process.

23. A mold for molding a viewfinder system, comprising:
    an upper molding member having a first molding surface;
    a lower molding member having a second molding surface, the molding surfaces being spaced-apart and in fluid communication with each other when said mold is in a molding position in order to form a molding volume therebetween; said mold having at least two pairs of lens forming lens nubbins, each of said lens nubbins having a highly polished surface, the surfaces of each lens nubbin of said pair facing one another to define a lens molding region in said molding volume, said surfaces of said lens nubbins being generally perpendicular with respect to said molding surfaces.

24. The mold according to claim 23, further comprising:
    at least two sliding members slidingly attached to said lower molding member, each of said sliding members having one of said lens nubbins attached thereto, said sliding members being movable between a first position when said mold is in said molding position and a second position when said mold is in a release position.

25. The mold according to claim 23, further comprising:
    at least two flippers pivotingly mounted to said lower member, each of said flippers having one of said lens nubbins attached thereto and a protrusion thereon, each of said flippers also having an upper surface and a side surface which define a portion of said molding volume;
    a wedge for sliding between first and second positions and mounted on said lower member between said flippers, said wedge having a pair of protrusions thereon aligned with the protrusions on said flippers such that sliding said wedge from a first position to a second position causes the protrusions on said wedge and flippers to contact, said contact causing said flippers to pivot said lens nubbins attached to said flippers away from said molding volume;
    a pair of pins attached to said upper member, said pins extending away from said molding volume; and
    said slides each having an opening in the upper surface thereof for receiving said pins, said openings having an orientation complementary to the orientation of said pins, said pins and said openings cooperating to slide said slides away from said molding volume when said upper member and said lower member are moved from said molding position to said release position.

26. A mold for molding a viewfinder system comprising:
    means for providing a molding volume including a plurality of lens volumes and a support volume, said lens and support volumes being in fluid communication with each other, said providing means being positionable between a molding position and a release position;
    lens forming means attached to said providing means for forming a pair of lenses and a support extending between said lenses inside said molding volume; and means for moving said lens forming means from a lens molding position to a lens release position.

27. A method of making a viewfinder system having at least two lenses in optical alignment, comprising:

providing a molding volume having inner surfaces defining a support volume and two or more lens volumes defined by pairs of spaced-apart movable lens nubbins, each lens nubbin having an optical-lens-forming surface;

disposing said lens nubbins in a molding position;

injecting said molding volume with a lens-forming material;

forming said viewfinder system by hardening said material; and retracting said lens nubbins in order to release the viewfinder system from said mold.

28. A disposable single-use camera comprising a taking lens for receiving an focusing an image of an object onto a focal plane, a roll of film having a plurality of frames selectively movable in sequential order into said focal plane, means for advancing the film frames into and out of said focal plane, a camera housing for housing said roll of film and said means for advancing, said housing having a top cover attached to said housing said top cover having a support integrally formed with at least two viewfinder lenses in optical alignment with each other.

29. The single use camera according to claim 28 wherein said top cover further comprises a shutter release integrally formed with said top cover.

30. The single use camera according to claim 28 wherein said film includes means for magnifying and displaying the number of the frame of said film to be exposed next, said magnifying and displaying means being integrally formed with said top cover.

31. The single-use camera according to claim 28 wherein the viewfinder lenses extend perpendicularly from opposite edges of said support.

32. The single use camera according to claim 31, wherein the viewfinder lenses and said top cover are formed into an integral unit in a single molding process.

33. The single-use camera according to claim 28, wherein each of the viewfinder lenses lies in a plane perpendicular to said support.

34. A method of making a unibody viewfinder having a plurality of lenses and sharing a common principal axis comprising:

providing a mold having a molding volume corresponding to said unibody viewfinder, said mold including a plurality of lens volumes and a support volume being in fluid communication with said lens volumes, introducing a molding material into said mold to fill said molding volume;

solidifying said molding material in said mold to integrally form the unibody viewfinder with a plurality of lenses and a support, removing said viewfinder from said mold.

35. The method of claim 34 wherein said molding volume comprises at least one projection.

36. The method of claim 35 wherein the plurality of lens volumes are defined by inner surfaces of the mold including a plurality of pairs of highly polished surfaces for molding opposite surfaces of said lenses.

37. The method according to claim 36, wherein said plurality of pairs of highly polished surfaces are provided by a plurality of pairs of lens nubbins, at least one of said lens nubbins forming an undercut corresponding to said projection, the highly polished surfaces of each pair of lens nubbins facing one another to define a region in said mold in which said lenses are formed.

38. The method according to claim 37, wherein said step of removing said viewfinder comprises:

moving each lens nubbin of said pair of lens nubbins away from its associated lens, whereby said projection is released and does not prevent said solidified material from being removed from said mold.

39. The method according to claim 38, wherein each lens nubbin of a pair is juxtaposed to the other.

40. The method according to claim 38, wherein one lens nubbin of a pair moves in one direction and the other lens nubbin moves in the opposite direction.

41. The method according to claim 38, wherein the mold further comprises a flipper pivotably attached to said mold for carrying a lens nubbin, and wherein pivoting said flipper in one direction moves said lens nubbin into a lens forming position and pivoting said flipper in the opposite direction moves said lens nubbin into a release position.

42. The method according to claim 41 further comprising a plurality of said flippers, said flippers being pivoted in opposite directions, respectively, to form a molding and a release position.

43. The method according to claim 38, wherein the mold further comprises a sliding member attached to at least one of said lens nubbins and slidably attached to said mold for moving said lens nubbin into a lens forming position.

44. The method according to claim 43, wherein said mold comprises a plurality of said slides, said slides sliding in opposite directions to form a molding and a release position.

45. The method according to claim 41, wherein said mold further comprises one or more wedges slidably attached thereto and disposed between and aligned for contact with different ones of said pairs of flippers.

46. The method according to claim 45, wherein said mold further comprises an upper molding member and a lower molding member, said wedges being disposed in said lower member, said lower member supporting said sliding members and said flippers, said upper and lower members defining a molding volume therebetween when in a molding position, said upper member and said slides coming together at surfaces each of which are substantially planar and being separable along a parting line between said planar surfaces.

47. The method according to claim 45, wherein said flippers and said wedge each have at least one protrusion thereon, the protrusions on said wedge and said flippers being aligned such that sliding said wedge causes the protrusion on said wedge to contact the aligned protrusion on said flippers.

48. The method according to claim 47, wherein pivoting said flipper comprises sliding said wedge to cause one of the protrusions thereon to contact the aligned protrusion on one of said flippers, whereby said flipper pivots and said projection is released.

49. The method according to claim 34, wherein said molding material is polycarbonate.

50. The method according to claim 34, wherein said molding material is acrylic.

51. The method according to claim 34, wherein said molding material is polystyrene.

52. The method according to claim 34, wherein said molding material is a thermoplastic polyester.

53. The method according to claim 34, wherein said molding material is a transparent resin material.

* * * * *